United States Patent [19]
Beekman

[11] 3,876,758
[45] Apr. 8, 1975

[54] PROCESS FOR PREPARING ALCOHOL SOLUTIONS OF ALUMINUM CHLORHYDROXIDES FOR ANTIPERSPIRANT USE AND FOR OTHER USES AND COMPOSITIONS CONTAINING THE SAME

[76] Inventor: Stewart M. Beekman, P.O. Box 277, Signal Mountain, Tenn. 37377

[22] Filed: Dec. 1, 1969

[21] Appl. No.: 881,297

[52] U.S. Cl. ............... 424/47; 424/DIG. 5; 424/46; 424/68
[51] Int. Cl. .............................................. A61k 7/00
[58] Field of Search .................. 424/68, 47, 64, 46; 260/448 AD

[56] References Cited
UNITED STATES PATENTS

| | | | |
|---|---|---|---|
| 3,288,681 | 11/1966 | Goldberg et al. | 424/68 |
| 3,359,169 | 12/1967 | Slater, Jr. et al. | 424/68 |
| 3,420,932 | 1/1969 | Jones et al. | 424/47 |
| 3,507,896 | 4/1970 | Jones et al. | 424/68 X |
| 3,523,129 | 8/1970 | Holbert et al. | 424/68 X |
| 3,523,130 | 8/1970 | Jones et al. | 260/448 AD |

Primary Examiner—Stanley L. Friedman
Assistant Examiner—Dale R. Ore

[57] ABSTRACT

A process is provided for preparing alcohol solutions of aluminum chlorhydroxides by reaction of a solution of aluminum chloride in an aliphatic alcohol with a blend or complex of polyol and an aluminum chlorhydroxide, thereby forming a solution in the alcohol of an aluminum chlorhydroxide having a lower $Al_2O_3$:Cl mole ratio than the starting material. The process avoids the use of an aluminum isopropylate, and the resulting solutions do not form precipitates on standing, and have a good stability. They are accordingly particularly useful for the preparation of nongelling stable antiperspirant aerosol and other applications, where an alcohol-soluble antiperspirant is desirable.

13 Claims, No Drawings

PROCESS FOR PREPARING ALCOHOL SOLUTIONS OF ALUMINUM CHLORHYDROXIDES FOR ANTIPERSPIRANT USE AND FOR OTHER USES AND COMPOSITIONS CONTAINING THE SAME

Aluminum chlorhydroxides of the type $Al_n(OH)_mCl_{3n-m}$, and particularly the 5/6 basic aluminum chlorhydroxides $Al_2(OH)_5Cl$, are widely favored as the active ingredients of personal antiperspirant deodorants. They are water-soluble, and readily formulated in aqueous solutions, creams, or pastes, in which form they are quite stable, and highly effective. They are, however, organic solvent-insoluble, and consequently their formulation as aerosol and organic solvent liquid antiperspirant compositions has posed serious problems.

An aerosol solution must form a homogeneous system with the fluorocarbon propellants that are used therein, and organic solvent-insoluble materials are not capable of doing so. The aerosol composition should not cause can corrosion, or stress cracking of plastic containers. It must be stable, and it should not clog the aerosol valves and actuators during normal use. It should not contain significant amounts of iron, since iron deactivates hexachlorophene, and may catalyze perfume decomposition. In addition, it must, of course, have the desirable properties of other active forms of antiperspirants, in that is should be safe to use, effective, non-irritating, should not damage the clothing, and should not form a film or residue on the skin that is oily, dry, or tacky. It is unfortunate that the aluminum chlorhydroxides meet so many of these requirements, and yet are not useful per se because they do not meet the first two.

First attempts to formulate aerosol antiperspirant systems were based on available aluminum salts which were soluble in ethanol. Aluminum phenol sulfonate, which is soluble in ethanol, was perhaps the first to be used commercially. However, Kennon, *Journal of Pharmaceutical Science*, 54 813 (1965), suggested that this salt is ineffective. In 1958, Brown and Govett, U.S. Pat. No. 2,823,169, dated Feb. 11, 1958, proposed a series of aluminum chlorhydroxy ethylates, but these have not been successfully commercialized. They are rather unstable, and contain significant amounts of iron. Neumann and Kottler, U.S. Pat. No. 2,872,379, dated Feb. 3, 1959, suggested aluminum alkoxy chlorides such as $Al_2(OR)_5Cl$ or $Al(OR)_2Cl$, but these compounds are quite insoluble in anhydrous ethanol.

Slater, Jass and Ugelow, U.S. Pat. No. 3,359,169, dated Dec. 19, 1967, and Jones and Rubino, U.S. Pat. No. 3,420,932, dated Jan. 7, 1969, propose reaction products or complexes of aluminum chloride or aluminum chlorhydroxide with polyols. Infra-red studies have shown the presence of new hydrogen bonds between the glycol and the hydroxyls of the aluminum chlorhydroxide that are not present in the glycol or aluminum chlorhydroxide alone. This suggests that a complex is formed. These compositions can be reduced to a solid powdered form, and are soluble in organic solvents such as ethanol, but because of the diluting effect of the polyol component, they have a rather low content of aluminum oxide, as compared to the aluminum chlorhydroxide.

A further problem is a noticeable stickiness or tackiness in the film formed on the skin by solutions of these compositions, as a result of the content of free polyol. Moreover, these compositions when in liquid aerosol form require large concentrations both of emollients for good feel, and of surfactants to prevent gelation, but these components may diminish antiperspirant effectiveness.

Beekman, Holbert and Schmank, in the *J. Soc. Cosmetic Chemists* 18, 105–122 (1967), U.S. Pat. Nos. 3,444,226 and 3,444,292, dated May 13, 1969, describe a group of new aluminum chemicals, 2-chloro-1,3,2-dioxalumolanes, specifically created for aerosol antiperspirant use, based on reaction products of chloraluminum diisopropoxide with a two to six carbon atom aliphatic polyhydric alcohol having hydroxyl groups on carbon atoms which are spaced apart by no more than one intervening carbon atom. These compositions have an excellent antiperspirant effectiveness, and are soluble in ethanol, but they are expensive to prepare. A further difficulty arises from the fact that these compounds are prepared starting from an aluminum triisopropoxide, which results in the formation of isopropanol as a by-product of the reaction. It is rather difficult if not impossible to separate all the isopropanol from the reaction product, and unfortunately, the presence of isopropanol even in very small amounts in aerosol and other anti-perspirant formulations is not favored by cosmetic formulators.

In accordance with the invention, alcohol-soluble aluminum chlorhydroxides are provided, which have a high alumina-polyol ratio by reaction of a solution of aluminum chloride in a lower aliphatic alcohol with a blend or complex of an aluminum chlorhydroxide and a polyol. The resulting solutions are quite stable, and form stable, nongelling aerosol antiperspirant systems with fluorocarbon propellants. The solutions can be reduced to alcohol-soluble stable amorphous solids. Because of their exceptionally high ratio of alumina to polyol, the compositions of the invention, whether liquid or solid, are highly effective antiperspirants, with a very acceptable skin feel, and have all of the desirable antiperspirant properties of the aluminum chlorhydroxides, with virtually none of their usual disadvantages, or of the disadvantages of the aluminum chlorhydroxide-polyol blends or complexes.

These solutions and solid forms are also useful in other ways in which aluminum chlorhydroxides are employed pharmaceutically, for instance, as astringents, and as the active antiperspirant ingredient in antiperspirant pastes, creams, lotions, solutions, powders, powdered aerosols, gels, sticks, and pad impregnants.

The nature of the aluminum chloride-aluminum chlorhydroxide reaction product has not been fully established. It is believed to be an aluminum chlorhydroxide having a lower ratio of aluminum oxide to polyol than the starting material, because of the reaction with aluminum chloride. Infra-red qualitative spectroscopic analysis suggests that the polyol (which is present initially with the aluminum chlorhydroxide) is complexed with the reaction product. The reaction product has been compared to a simple unheated blend of one mole of aluminum chlorhydroxide $Al_2(OH)_5Cl$, with 0.5 mole of propylene glycol; in this comparison, the reaction product was obtained by reacting 12 moles of the blend with one mole of $AlCl_3$ in anhydrous ethanol, followed by removal of the ethanol. The reaction product contains more and stronger OH → O hydrogen bonds, and the primary alcohol group of the propylene glycol is more involved in hydrogen bonding, and the cyclic nature of the aluminum chlorhydroxide has changed in the reaction product, as shown by stronger hydroxyl stretching absorptions at 3,226 and 3,150 cm$^{-1}$, a reduced relative intensity of the 1,044 cm$^{-1}$ band, and a shift from 772 cm$^{-1}$ in aluminum chlorhydroxide to 767 cm$^{-1}$, respectively as compared to the dry blend.

The reaction product has also been compared to a simple reaction product of aluminum chlorhydroxide (one mole) and one mole of propylene glycol. In the reaction product of the invention there is more hydrogen bonding of the primary alcohol group of the propylene glycol, and a lesser change in the cyclic nature of the aluminum chlorhydroxide, as shown by a relatively reduced intensity of the 1,044 cm$^{-1}$ band and a lesser shift at 767 cm$^{-1}$ (versus 762 cm$^{-1}$), respectively, as compared to the simple reaction product.

The general reaction of the invention can be represented as follows:

$$xAlCl_3 + yAl_2(OH)_n\, Cl_{6-n}$$
$$\rightarrow x+y(Al_n\, (OH)_m Cl_{3n\,-m})$$

In the above representation, $x$ represents the number of moles of aluminum chloride and $y$ the number of moles of aluminum chlorhydroxide that are reacted. The resulting reaction product contains aluminum and chlorine as a total of both the number of moles of aluminum chloride and the number of moles of aluminum chlorhydroxide that have been reacted. Thus, by adjustment of the molar proportions of the reactants, a product having any desired $Al_2O_3$:CL and $Al_2O_3$:OH mole ratio can be obtained.

$n_1$ represents the number of units of OH, and is a number from two to five.

$n_2$ represents the number of aluminum atoms in the final product, and is a number from one to fifty.

$n_2$ and $m$ together determine the number of chlorine atoms to satisfy the valences of the aluminum.

By means of this reaction, a whole series of aluminum chlorhydroxides can be prepared, having $Al_2O_3$:Cl mole ratios of from 1:5 to 1:1.05 and $Al_2O_3$:OH mole ratios of from 1:1 to 1:4.95, according to the relative proportions of aluminum chloride and aluminum chlorhydroxide used.

It will be understood that in all of the reaction sequences shown herein, the aluminum chlorhydroxide is used in the form of a complex or blend with a polyol, but since the polyol takes not part in the reaction, it is not shown. The following reactions illustrate the preparation of a series of aluminum chlorhydroxides by the process of the invention.

|  | Reactants | | Product Aluminum Chlorhydroxide | Basicity |
|---|---|---|---|---|
| 1. | $Al_2(OH)_5Cl + 8AlCl_3$ | → | $5Al_2(OH)Cl_5$ | 0.166 |
| 2. | $4Al_2(OH)_5Cl + 2AlCl_3$ | → | $5Al_2(OH)_4Cl_2$ | 0.333 |
| 3. | $3Al_2(OH)_5Cl + 4AlCl_3$ | → | $5Al_2(OH)_3Cl_3$ | 0.50 |
| 4. | $Al_2(OH)_5Cl + AlCl_3$ | → | $Al_3(OH)_5Cl_4$ | 0.555 |
| 5. | $2Al_2(OH)_5Cl + AlCl_3$ | → | $Al_5(OH)_{10}Cl_5$ | 0.66 |
| 6. | $3Al_2(OH)_5Cl + AlCl_3$ | → | $Al_7(OH)_{15}Cl_6$ | 0.713 |
| 7. | $7Al_2(OH)_5Cl + 2AlCl_3$ | → | $Al_{16}(OH)_{35}Cl_{13}$ | 0.729 |
| 8. | $4Al_2(OH)_5Cl + AlCl_3$ | → | $Al_9(OH)_{20}Cl_7$ | 0.74 |
| 9. | $5Al_2(OH)_5Cl + AlCl_3$ | → | $Al_{11}(OH)_{25}Cl_8$ | 0.758 |
| 10. | $6Al_2(OH)_5Cl + AlCl_3$ | → | $Al_{13}(OH)_{30}Cl_9$ | 0.77 |
| 11. | $7Al_2(OH)_5Cl + AlCl_3$ | → | $Al_{15}(OH)_{35}Cl_{10}$ | 0.778 |
| 12. | $9Al_2(OH)_5Cl + AlCl_3$ | → | $Al_{19}(OH)_{45}Cl_{12}$ | 0.790 |
| 13. | $10Al_2(OH)_5Cl + AlCl_3$ | → | $Al_{21}(OH)_{50}Cl_{13}$ | 0.794 |
| 14. | $11Al_2(OH)_5Cl + AlCl_3$ | → | $Al_{23}(OH)_{55}Cl_{14}$ | 0.798 |
| 15. | $12Al_2(OH)_5Cl + AlCl_3$ | → | $Al_{25}(OH)_{60}Cl_{15}$ | 0.800 |
| 16. | $13Al_2(OH)_5Cl + AlCl_3$ | → | $Al_{27}(OH)_{65}Cl_{16}$ | 0.802 |
| 17. | $14Al_2(OH)_5Cl + AlCl_3$ | → | $Al_{29}(OH)_{70}Cl_{17}$ | 0.804 |
| 18. | $15Al_2(OH)_5Cl + AlCl_3$ | → | $Al_{31}(OH)_{75}Cl_{18}$ | 0.805 |
| 19. | $20Al_2(OH)_5Cl + AlCl_3$ | → | $Al_{41}(OH)_{100}Cl_{23}$ | 0.815 |
| 20. | $22Al_2(OH)_5Cl + AlCl_3$ | → | $Al_{45}(OH)_{110}Cl_{25}$ | 0.815 |
| 21. | $24Al_2(OH)_5Cl + AlCl_3$ | → | $Al_{49}(OH)_{120}Cl_{27}$ | 0.816 |

The increase in basicity with increasing aluminum chlorhydroxide is evident from the above.

The more effective antiperspirant aluminum chlorhydroxides are relatively acidic, and the less irritating (to the skin) aluminum chlorhydroxides are relatively basic. It is necessary to strike a balance between the two extremes, for most antiperspirant uses. The aluminum chlorhydroxides having a basicity within the range from about 0.729 to about 0.816 are accordingly preferred for antiperspirant uses.

The reaction of the invention can be carried out using either anhydrous aluminum chloride or aluminum chloride hexahydrate. When the hydrate is used, more water may be added to the reaction system than may be required, and it may therefore be necessary to remove water from the reaction product at the conclusion of the reaction. For this reason, the use of anhydrous aluminum chloride is usually preferable.

The aluminum chloride is employed in the form of an anhydrous solution in a lower aliphatic alcohol. Ethanol is most readily available, and is preferred. Methanol can also be used, but since it is toxic, its separation from the final product must be complete. Isopropanol is not favored in aerosol formulations, and therefore would not normally be employed, but it is operative, and can be used if its presence in the final product is not regarded as a disadvantage. The same is true of n-propanol, and the butanols. Alcohols above the butanols have a relatively low volatility, and are not normally used.

The aluminum chloride dissolves readily in the alcohol with liberation of heat, at room temperature and at elevated temperatures. It may be convenient during dissolution to permit the temperature to rise to approximately the intended reaction temperature.

The aluminum chlorhydroxide starting material is employed in the form of a solution, blend, or complex with a polyol. The solution or blend can be prepared by simply mixing or dispersing the aluminum chlorhydroxide in the polyol. The polyols that can be used have from two to three hydroxyl groups, and include any of those named in U.S. Pat. Nos. 3,359,169 and 3,420,932. The aluminum chlorhydroxides have from two to five hydroxyl groups and from one to four chlorine atoms, and are also described in these patents.

The complexes are known compositions, and are described in U.S. Pat. No. 3,359,169, to Slater, Jass and Ugelow, U.S. Pat. No. 3,420,932 to Jones and Rubino, and in the article by Rubino in *Drug and Cosmetic Industry*, November, 1966, entitled "A New Aerosol Antiperspirant."

The compositions described by Slater, et al., and useful in this invention are prepared by reacting aluminum compounds of the formula $$Al_2Cl_{(6-x)}(OH)_x$$

where $x$ is a number from two to five, with a polyol having two to three hydroxyl groups. The polyols include polyhydroxy alkyl compounds, e.g., glycols such as ethylene glycol, propylene glycol, 1,3-butanediol and 1,4-butanediol, as well as unsaturated aliphatic hydrocarbon materials such as 1,4-butenediol and the like. Aliphatic ether glycols having one or more ether linkages in the carbon chain (e.g., polyoxyalkylene glycols having a molecular weight up to about 500, preferably to about 200) are suitable, such as diethylene glycol, dipropylene glycol, triethylene glycol, and tetraethylene glycol, for example. Glycerol, diglycerol, 1,2,6-hexanetriol, 1,2,4-butanetriol, and trimethylolpropane, are representative of polyhydroxy compounds having more than two hydroxy groups. Trimethylolpropane is representative of numerous branched chain polyhydric alcohols which can be employed, e.g. 2-methyl-2-ethyl-1,3-propanediol; 2-methyl-2,4-pentanediol.

To prepare the compounds, the hydroxylic reagent and an appropriate aluminum compound such as a chlorohydroxide compound prepared, for example, according to the procedure mentioned in Australian Pat. No. 150,410 of Mar. 15, 1953, are contacted, in the proportions desired in the final product, in the presence of sufficient water to dissolve all of the aluminum compound. The compounds are obtained on removal of water from the system. Conveniently, the water is removed by evaporation at room temperature or below, or at an elevated temperature, suitably up to about 80°C. Particularly good results are obtained by evaporation at a temperature between about 50°–60°C., at which temperatures evaporation proceeds relatively rapidly, and there is no question of possible decomposition of the products by the use of excessive temperatures. At any of these temperatures, reduced pressure, for example, a pressure of 25 mm. Hg furnished by an aspirator, may be employed to speed the removal of water, but is not necessary. Also, reduced pressure may speed the removal of water when temperatures below room temperature (about 18°–25°C.) are employed, or reduce heating time when temperatures greater than 80°C. are used. The solid product is soluble in alcohol and water and can be recrystallized from alcohol, e.g., ethanol, or water, or can be precipitated from alcohol or water solutions by the addition of a non-polar solvent such as ether or acetone.

The Jones, et al., compositions are described as coordination compounds (complexes) containing aluminum, and having the formula:

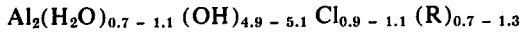

$Al_2(H_2O)_{0.7-1.1}(OH)_{4.9-5.1}Cl_{0.9-1.1}(R)_{0.7-1.3}$ wherein R is the coordinating moiety of a polyhydroxy compound having a carbon chain in which at least two carbon atoms link a hydroxyl group to said chain.

The aluminum basic chloride and the polyhydroxy compound are combined to form a solution which, thereafter, is heated to form the aluminum complex. Preferably, though not necessarily, the heating will continue until substantially all excess water is expelled from the solution and a dry product is formed.

The term "aluminum basic chloride," refers to those compounds having the formula:

$Al_2(OH)_xCl_y$ wherein: $x$ is a positive integer of from 2 to 5; $y$ is a positive integer of from 1 to 4; and $x$ and $y$ will always total 6. Representative of the aluminum basic chlorides herein contemplated are: $Al_2(OH)_2Cl_4$; $Al_2(OH)_4Cl_2$, $Al_2(OH)_5Cl$. Particularly fine results are said to be obtained when an aluminum basic chloride having an aluminum to chlorine mol ratio of from about 1:2 up to about 2.1:1, more advantageously between about 1:1 to about 2:1 is used.

The term "polyhydroxy compound" means those organic compounds containing two or more hydroxy groups (prior to condensation) linked to adjacent or non-adjacent carbon atoms, including dihydric and polyhydric alcohols.

Suitable polyhydroxy compounds include: propylene glycol; 1,1,1-trimethylolpropane; 1,3-butylene glycol (1,3-butanediol); glycerine (1,2,3-trihydroxy propane); 2-methyl-2,4-pentanediol; neopentyl glycol (2,2-dimethyl-1,3-dihydroxy pentane); polyethylene glycol (mol. wt. = 400); Polyglycol 15–200 (a Dow material having an ethereal linkage between propylene oxide and ethylene and condensed with glycerine in which each chain has a terminal hydroxy group (mol. wt. = 2700)); p-xylene $\alpha,\alpha$-diol; and polyepichlorohydrin; butyne-1,4-diol; 2-ethyl-1,3-hexane-diol; and polypropylene glycol (av. mol. wt. = 400).

The reaction between the aluminum chlorhydroxide and the polyhydroxy compound should be effected at a temperature within the range of 50° to 120°C. Preferably, the reaction temperature should be of the order of 80° to 110°C. A temperature range of 90° to 105°C. is optimum. Reaction can be effected with agitation, such as stirring or other conventional mixing procedures. The time of the reaction is temperature dependent, and operational times may be determined for any specific concentrations and specific starting materials by routine testing within the skill of a worker in the art. Generally, from a few minutes to several hours constitutes adequate reaction time. In addition to the reaction time being temperature dependent, it is also dependent upon the extent of agitation applied to the mixture.

The coordination compounds may be dried by spray drying or by vacuum drying to a product containing between about 1 and 10 weight percent of moisture as determined by the Karl Fischer Assay method.

The aluminum chlorhydroxide solutions in accordance with this invention are prepared by mixing a solution of aluminum chloride in a lower aliphatic alcohol with the aluminum chlorhydroxide-polyol blend or complex, in solution or solid form, and heating at a temperature at which reaction proceeds, with dissolution of any solid aluminum chlorhydroxide-polyol complex in the aluminum chloride alcohol solution. That reaction takes place is shown by the fact that aluminum chloride cannot be isolated from the reaction mixture, and by the fact that these solutions are stable, and do not gel in aerosol formulations, containing up to 50% propellant, whereas solutions of the aluminum chlorhydroxide-polyol complex do gel in aerosol formulations containing up to 50% propellant.

The reaction proceeds upon heating the reaction mixture at a temperature within the range from about 40°C. to about 80°C., or up to the boiling point of the alcohol at atmospheric pressure. Reaction is usually complete in from ½ hour to 6 hours' time, under these conditions.

After reaction is complete, the reaction mixture may be concentrated, especially if the content of water therein is unduly high, so as to reduce the water content to less than 5% in the final solution. If the water content is less than 1% in the aerosol composition, the solution is stable against gelation or precipitation. The spray rate also remains constant, and the composition remains effective as an anti-perspirant.

The water content of the alcohol solutions can be reduced by treatment with molecular sieves capable of preferentially absorbing water to alcohol, or by evaporation at atmospheric or reduced pressure, or by removal of an azeotrope of alcohol and water, and then replacing with alcohol.

The compositions can also be reduced to solid form by removing all solvents, by drying at temperatures less than 100°C., and preferably less than 80°C., at atmospheric or reduced pressure. Spray drying, vacuum drying, and tray-drying procedures can be used. The resulting solids are amorphous, non-melting, and stable. They are alcohol-soluble, and can be sold for formulation into solid and liquid types of antiperspirant and astringent compositions, and for other uses, in the manner of aluminum chlorhydroxides.

After adjustment of the water content, the reaction mixture is ready to use without further treatment as the active component in antiperspirant formulations of all types. Because it is an ethanol or other aliphatic alcohol solution, it is particularly adapted for use in aerosol formulations, and in liquid formulations for roll-on application. However, it can be employed in any type of antiperspirant composition, including liquids; flowable, semi-flowable and solid creams; sticks; lotions; sprays; powders; and powdered aerosols.

The liquid antiperspirant compositions contain as the essential ingredients the aluminum chlorhydroxide reaction product, the alcohol solvent used as the reaction medium, and if desired, water. A perfume and a coloring agent are usually also added.

A propellant composition contains in addition a propellant base. The propellant should have a vapor pressure at room temperature within the range from about 25 to about 60 psi. The materials meeting this qualification are fluorine-containing or fluorine- and chlorine-containing aliphatic hydrocarbons having from one to four carbon atoms, such as for example, dichlorotetrafluoroethane, dichlorotrifluoromethane, octafluorocyclobutane, and trichloromonofluoromethane. Mixtures of these can also be used, such as mixtures of dichlorodifluoromethane and trichloromonofluoromethane. The propellant normally comprises from about 25 to about 75% of the composition, and the aluminum chlorhydroxide from 4 to 15% of the composition. The solvent is within the range from about 20 to about 60% by weight of the composition. Softening agents, perfumes, solubilizers and antitack agents can also be added.

A cream formulation is based on the aluminum chlorhydroxide-aliphatic alcohol solution, with the addition of a thickening agent and polyol fatty acid esters in amounts to provide the desired consistency, ranging from a readily flowable liquid to a thick, viscous or nonflowable paste. Thickening agents which can be employed include alcohol-soluble cellulose derivatives, such as methyl cellulose, ethyl cellulose, ethyl hydroxyethyl cellulose, and propyl hydroxyethyl cellulose. Fatty acid esters which can be used include polyoxyethylene monostearate and glyceryl monostearate. Perfumes, coloring agents and other solvents can also be added.

A roll-on antiperspirant composition is based on the aluminum chlorhydroxide-aliphatic alcohol solution together with antitack agents and film-forming resins.

An aerosol antiperspirant composition including an aluminum chlorhydroxide of the invention and a finely-divided alcohol-insoluble aluminum chlorhydroxide, such as a 5/6 basic aluminum chlorhydroxide, $Al_2(OH)_5Cl$, is also advantageous. Such a composition contains aluminum chlorhydroxide of the invention in solution in a lower aliphatic alcohol, such as ethanol, and a propellant base; finely-divided alcohol insoluble aluminum chlorhydroxide; and from about 0.5 to about 5% suspending agent, such as fumed silica or fumed alumina; and, optionally, an oil or emollient, suspended or dispersed in the alcohol.

The following formulation is typical:

| | |
|---|---|
| Alcohol-soluble aluminum chlorhydroxide of the invention | 4 to 15% (solids basis) |
| Alcohol-insoluble aluminum chlorhydroxide powder (finely-divided) | 0.5 to 5% preferably 1 to 3% |
| Anhydrous ethanol | 10 to 30% |
| Emollient, antitack agent, perfume solubilizer | 0 to 10% |
| Suspending agent | 0.3 to 2% |
| Perfume | 0 to 1% |
| Liquefied propellant | 40 to 90% |

The suspended or dispersed materials should be quite finely-divided, to avoid plugging of the valves of the aerosol container. Preferably, the particles should be liquid or, if solid, have a size below $100\mu$, and preferably below $50\mu$.

The types of antiperspirant formulations in which the aluminum chlorhydroxides of the invention can be used are further illustrated in Chapter 32, pages 717 to 739 of *Cosmetics Science and Technology*, Interscience Publishers, New York (1957), the disclosure of which is hereby incorporated by reference. The compositions can be used as the source of aluminum chlorhydroxide in any of the formulations containing aluminum chlorhydroxides shown therein.

The aluminum chlorhydroxide solutions in accordance with the invention are compatible with all of the various ingredients normally employed in compositions of these types.

The following Examples in the opinion of the inventor represent preferred embodiments of the invention.

EXAMPLE 1

A 22% by weight solution of a 0.816 basic aluminum chlorhydroxide $Al_{49}(OH)_{120}Cl_{27}$ in anhydrous ethanol was prepared.

266 g. of a 5/6 basic aluminum chlorhydroxide powder was prepared by reacting 5 atomic weights of aluminum powder with one mole of aluminum chloride in aqueous solution at 80° to 90°C. The reaction mixture was filtered, and the solid was dried in thin layers in trays while blowing air at 180°F. over the material. The resulting cake was pulverized to a 100 mesh powder with a hammer mill, using a 0.013 inch herringbone screen. The powder had an aluminum content of 43.5% (as $Al_2O_3$) and a chlorine content (as $Cl^-$) of 15.26%.

This material was converted to the propylene glycol blend or complex. The powder was placed in a stainless steel one gallon bowl of a mixer generally used for cake batter. 37.8 g. of propylene glycol was added dropwise to the basic aluminum chlorhydroxide over a 30 minute period, with stirring. The resulting blend was a dense free-flowing powder, composed of small granules. The mixture was ground in dry air in a screen type hammer mill to about 100 mesh size.

6.93 g. of anhydrous aluminum chloride powder having an iron content of less than 20 ppm. was slowly dissolved in 690 g. of anhydrous ethanol. The ethanol solution was heated to 73° to 79°C. and the 303.8 g. of aluminum chlorhydroxide propylene glycol complex was then slowly added over a two hour period, with efficient agitation. The resulting solution was allowed to stand for seven hours with slow stirring. The resulting solution was then filtered through an asbestos cellulose filter pad of medium filtration characteristics.

The resulting alcohol solution contained 12.93% of $Al_2O_3$ and 5.0% chlorine. The Al:Cl atomic ratio was 1.85:1.00. The total weight of material recovered was 916 g. The pH on dilution with 5 volumes of water was 4.3.

An aerosol antiperspirant composition was prepared to the following formulation and bottled in clear plastic-coated glass bottles.

| Composition | Weight |
| --- | --- |
| 22% solution 0.816 basic aluminum chlorhydroxide | 23.2 g. |
| Hexachlorophene | 0.1 g. |
| Anhydrous ethanol | 26.7 g. |
| Propellant (60/40 mixture of Freon 12 and Freon 114)[1] | 50.0 g. |

[1]Freon 114 is dichlorotetrafluoroethane and Freon 12 is dichlorodifluoromethane.

The aerosol bottles were stored at room temperature and at 37°C. over a 12 week period. During this time, there was no evidence of precipitation or gelation. The spray rate remained constant. Application of the composition to the body showed that it was effective as an antiperspirant.

EXAMPLE 2

An 18% by weight solution of a 0.80 basic aluminum chlorhydroxide in anhydrous ethanol, corresponding to the formula $Al_5(OH)_{12}Cl_3$, was prepared as follows.

A 5/6 basic aluminum chlorhydroxide powder 100 mesh was prepared in a manner similar to that described in Example 1. It contained 45.8% aluminum (as $Al_2O_3$), 16.0% chlorine (as $Cl^-$), and 12.5% water (by the Karl Fischer method).

214 g. of the 5/6 basic aluminum chlorhydroxide was added to the stainless steel bowl of a small dough mixer, and agitation begun. 36.5 g. of 1,2-propylene glycol was added dropwise over a 35 minute period, with constant stirring. The resulting solid, 250.5 g. of aluminum chlorhydroxide-propylene glycol complex, was pulverized to about 100 mesh, using a laboratory hammer mill.

19.6 g. of aluminum chloride hexahydrate were dissolved in 730 g. of anhydrous ethanol in a two-liter flask equipped with a glass stirrer, heating mantle, and reflux condenser. The temperature was raised to 75° to 80°C., and 250.5 g. of the 5/6 basic aluminum chlorhydroxide-propylene glycol powder was slowly added over a two hour period, with continued stirring. After an additional hour of stirring, the solution was filtered through an asbestos-cellulose filter pad of medium porosity. The resulting solution was analyzed, and found to contain 10.4% aluminum (as $Al_2O_3$), 4.2% chlorine (as $Cl^-$), 3.7% water (by the Karl Fischer method), and 3.6% propylene glycol. The pH upon dilution with 5 volumes of water was 4.3.

An aerosol antiperspirant composition was prepared from the 18% alcohol solution of the 0.800 basic aluminum chlorhydroxide solution, to the following formulation:

| Composition | Weight |
| --- | --- |
| $Al_5(OH)_{12}Cl_3$ (18% solution in ethanol) | 28.8 g. |
| Hexachlorophene | 0.1 g. |
| Anhydrous ethanol | 21.1 g. |
| Propellant (60/40 mixture of Freon 12/Freon 114) | 50.0 g. |

This aerosol formulation was packed in clear plastic-coated glass aerosol bottles and stored at room temperature and at 37°C. After 12 weeks, the aerosols had not gelled, nor had a precipitate formed. The spray rate of these compositions remained constant, and they were found to be effective as antiperspirants when applied to the body.

A 30% solution of an 0.800 basic aluminum chlorhydroxide was prepared as above, using 430 g. ethanol. The solution was found to contain 17.2% aluminum as $Al_2O_3$, 7.2% chlorine, 4.8% water by Karl Fischer and 6.3% propylene glycol.

120 g. of the clear solution was added to a tared porcelain dish and placed in a vacuum oven at 50°C. for 16 hours. A vacuum of 20–25 inches of mercury was maintained. The white, fragile, solid residue weighed 43 g. It was ground slightly in a mortar. The powder dissolved in warm anhydrous ethanol with stirring. It was found to contain 47.8% aluminum as $Al_2O_3$, 19.9% chlorine, 17.5% propylene glycol and less than 0.5% water by Karl Fischer method. The dried alcohol soluble residue had the following composition:

$Al_5(OH)_{12}Cl_3$(Propylene glycol)$_{1.1}$or
$Al_{2.0}(OH)_{4.8}Cl_{1.2}$(Propylene glycol)$_{0.4}$.

EXAMPLE 3

A 24% by weight solution of a 0.75 basic aluminum chlorhydroxide $Al_4(OH)_9Cl_3$ in anhydrous ethanol was prepared as follows.

269 g. of a finely-divided 5/6 basic aluminum chloride hydroxide powder was mixed for thirty minutes with 54 g. of 1,2-propylene glycol using a laboratory light duty dough mixer. The latter was added dropwise during a 30 minute period. Mixing was continued for an additional 15 minutes. The resulting free-flowing powder was pulverized through a laboratory screen type hammer mill to about 100 mesh size.

643 g. of anhydrous ethanol was added to a two-liter Pyrex round bottom blask provided with an agitator, condenser and heating mantle. 34 g. of anhydrous aluminum chloride powder was carefully added, and stirring continued until it was fully dissolved. The temperature was raised to 75° to 80°C., and the 323 g. of pulverized 5/6 basic aluminum chloride:propylene glycol complex was slowly added over a two hour period. The resulting solution was filtered through an asbestos-cellulose filter of medium porosity.

The yield was 924 g. The solution was analyzed, and found to contain 13.0% aluminum (as $Al_2O_3$), 6.7% chlorine (as $Cl^-$), 4% water by the Karl Fischer method, and 5.4% propylene glycol. The Al:Cl atomic ratio was 4:3, which corresponds to a 0.750 basic aluminum chlorhydroxide, represented by the formula $Al_4(OH)_9Cl_3$. The pH upon dilution with 5 volumes of water was 3.9.

An aerosol antiperspirant composition was prepared from the 24% 0.750 basic aluminum chlorhydroxide solution according to the following formulation, and packed in plastic coated glass bottles:

| Composition | Weight |
|---|---|
| Aluminum chlorhydroxide (24% 0.750 basic) | 23.1 g. |
| Hexachlorophene | 0.1 g. |
| Ethanol (anhydrous) | 26.8 g. |
| Propellant (Freon 12/114 60/40 mixture) | 50.0 g. |

The aerosols prepared as described were stored at room temperature and at 37°C. for 12 weeks. At the end of this time, there was no gelation, nor had a precipitate formed. The spray rate remained constant, and application of the aerosol formulations to the skin showed that they were effective antiperspirants.

EXAMPLE 4

A 30% solution of a 2/3 (0.66) basic aluminum chlorhydroxide $Al(OH)_2Cl$ solution in anhydrous ethanol was prepared as follows.

277 g. of a 5/6 basic aluminum chlorhydroxide powder prepared as described in Example 1, and containing 45.8% aluminum (as $Al_2O_3$), 16.0% chlorine (as $Cl^-$), and 12.5% water by the Karl Fischer method, was added to a mixing bowl of a cake mixer. With continuous agitation, 47.3 g. propylene glycol was added dropwise over a 30 minute period. Mixing was continued for 10 minutes. The resulting free-flowing powder was pulverized in a laboratory hammer mill.

82.5 g. of anhydrous aluminum chloride powder was carefully added to 594 g. of anhydrous ethanol in a two-liter flask provided with a glass stirrer, condenser and heating mantle. After all the aluminum chloride was dissolved, the temperature was raised to 75° to 80°C., and 324 g. of the 5/6 basic aluminum chlorhydroxide: propylene glycol complex was slowly added to the aluminum chloride solution. The addition time was about 2 hours. Heating and stirring were continued for an additional 30 minutes. The resulting solution was filtered through an asbestos pad.

The solution was analyzed and found to contain 15.9% aluminum (as $Al_2O_3$), 11.3% chlorine (as $Cl^-$), 4.6% propylene glycol, and 3.6% water by the Karl Fischer method. When diluted with 5 volumes of water, the solution had a pH of 3.8.

An aerosol antiperspirant composition was prepared to the following formulation:

| Composition | Weight |
|---|---|
| Aluminum chlorhydroxide (0.66 basic, 30% solution | 18.8 g. |
| Hexachlorophene | 0.1 g. |
| Anhydrous ethanol | 36.1 g. |
| Propellant (Freon 12/114 60/40 mixture) | 45.0 g. |

This composition was packaged in clear plastic coated glass bottles, and stored at room temperature at 37°C. for 12 weeks. At the end of this time, the solutions had not gelled, nor had a precipitate formed. The spray rate remained constant, and application of the composition to the skin showed that it was an effective antiperspirant.

EXAMPLE 5

A 16% solution of a 0.71 basic aluminum chlorhydroxide $Al_7(OH)_{15}Cl_6$ dissolved in anhydrous ethanol was prepared, using trimethylolpropane as the polyol.

167 g. of a 5/6 basic aluminum chlorhydroxide powder containing 43.5% aluminum (as $Al_2O_3$), 15.3% chlorine (as $Cl^-$) and 16.9% water by the Karl Fischer method was heated in a closed container to about 65°C. It was then added to a preheated bowl of a laboratory cake mixer. 49 g. of melted trimethylolpropane was added dropwise, over a 30 minute period, with continued stirring. The resulting mixture was a free-flowing powder in the form of small granules.

32.5 g. of anhydrous aluminum chloride powder was dissolved in 752 g. of ethanol contained in a two-liter round bottom flask provided with a stirrer, condenser, thermometer and heating mantle. After solution was complete, the temperature was brought to 75° to 80°C.

The 216 g. of 5/6 basic aluminum chlorhydroxide complex was pulverized, and slowly added to the alcoholic aluminum chloride solution. The time required for addition was 1 and ½ hours. The solution was filtered through an asbestos cellulose pad. A total of 915 g. of solution was recovered. This solution was analyzed, and found to contain 8.7% aluminum (as $Al_2O_3$), 5.4% chlorine (as $Cl^-$), 3.1% water by the Karl Fischer method, and 4.9% trimethylolpropane. The pH after dilution with one part of water was 3.9. The Al:Cl atomic ratio was 1.13:1.

An aerosol composition was prepared to the following formulation:

| Composition | Weight |
|---|---|
| Aluminum chlorhydroxide (16%, 0.71 basic) | 34.4 g. |
| Hexachlorophene | 0.1 g. |
| Anhydrous ethanol | 25.5 g. |
| Propellant (Freon 12/114 60/40 mixture) | 50.0 g. |

This aerosol composition was packaged in plastic coated glass bottles, and stored at room temperature and 37°C. for 12 weeks. At the end of this time, there was no gelation, nor had a precipitate formed. The spray rate was constant, and application of the composition to the skin showed that it was an effective antiperspirant.

EXAMPLE 6

A 25% solution of an 0.166 basic aluminum chlorhydroxide solution in anhydrous ethanol SDA 4O [$Al_2(OH)Cl_5]_n$ was prepared as follows:

A 5/6 basic aluminum chlorhydroxide powder was prepared in the manner described in Example 1. The dry powder contained 45.9% aluminum as $Al_2O_3$, 15.6% chloride and 13% free and combined water by the Karl Fischer method. 1,000 g. of the powder was added to a bowl of a one gallon dough mixer. 171 g. of 1,2-propylene glycol was added dropwise with agitation over about a one hour period. This is equivalent to one-half mole of propylene glycol per mole of aluminum as $Al_2O_3$. The resulting 1,171 g. of free flowing powder containing some granules was reduced to about 60 mesh with a stainless steel screen type hammer mill. The powder contained 39.4% aluminum as $Al_2O_3$, 13.4% chlorides and 14.5% propylene glycol. It was labeled 5/6 basic aluminum chlorhydroxide: propylene glycol blend mole ratio 1:0.5.

214 g. aluminum chloride anhydrous powder having an iron content of less than 15 ppm. was dissolved in 734 g. anhydrous ethanol contained in a 2 liter flask provided with means of heating, an efficient stirrer, thermometer and water cooled condenser.

When solution was complete, the temperature was adjusted to 75°–80°C. with agitation. 52 g. of the 5/6 basic aluminum chlorhydroxide:propylene glycol 1:0.5 powder was added over a one hour period. After solution was complete, agitation was continued for another hour at 75°–80°C. The resulting 1,000 g. of solution was partially cooled and filtered through a medium grade asbestos-cellulose filter to remove trace insolubles. The clear 25% solution contained 10.2% aluminum as $Al_2O_3$, 18.8% chlorine, 0.75% propylene glycol and 2.1% water by the Karl Fischer method. The pH was 3.3 after dilution with 5 parts of water.

Several aerosol antiperspirants were prepared in clear plastic coated bottles and valves containing plastic coated springs using the following formula:

| | |
|---|---|
| 1. 25% Anhydrous ethanol solution of an 0.166 — basic aluminum chlorhydroxide $Al_2(OH)Cl_5$ | 29.2% w/w |
| 2. Hexachlorophene | 0.1% |
| 3. Ethanol anhydrous | 20.7% |
| 4. Propellant (Freon 12/114 60/40 mixture) | 50.0% |

The aerosols remained clear without gelling or precipitation on storage at room temperature or 37°C. The spray rate remained constant.

A dried 0.166 basic aluminum chlorhydroxide powder $[Al_2(OH)Cl_5]_n$ was prepared by placing in a tared porcelain dish 100.0 g. of the 25% solution of a 0.166 basic aluminum chlorhydroxide solution, and placed in a vacuum oven for 16 hours at 50°C. with a vacuum of 20–25 inches of mercury. The solution contained 10.2% aluminum as $Al_2O_3$, 17.7% chlorine, 2.1% water by the Karl Fischer method, and 1.75% propylene glycol. The fragile, solid residue weighed 26.6 g. It was pulverized slightly in a mortar. It dissolved readily in warm anhydrous ethanol with stirring. The powder was found to contain 38.5% aluminum as $Al_2O_3$, 66% chlorine, 2.8% propylene glycol and less than 0.2% water by the Karl Fischer method. The composition of the powder approaches $Al_2(OH)Cl_5$ (Propylene Glycol)$_{0.1}$.

EXAMPLE 7

A 25% solution of an 0.500 basic aluminum chlorhydroxide ethanol in anhydrous ethanol SDA 40 $[Al_2(OH)_3Cl_3]_n$ was prepared as follows:

129.5 g. anhydrous aluminum chloride powder containing 10 ppm. of iron was dissolved in 682 g. anhydrous ethanol in an agitated 2 liter flask. 188.5 g. 5/6 basic aluminum chlorhydroxide: propylene glycol 1:0.5 mole ratio powder prepared as described above, in Example 6, was slowly added to the alcoholic aluminum chloride solution over a 2 hour period at 75°–80°C. After the addition was complete, heating and agitation was continued for one hour. The 1,000 g. of solution was partially cooled and filtered through an asbestos-cellulose filter to remove trace insolubles. The resulting clear solution contained 12.4% aluminum as $Al_2O_3$, 12.9% Cl, 3.1% water by the Karl Fischer method, and pH (1 + 5 parts $H_2O$) − 3.6.

Several aerosol antiperspirants were prepared in clear plastic coated glass bottles using the following formula:

| | |
|---|---|
| 25% Solution 0.500 basic aluminum chlorhydroxide | 25.2% w/w |
| Hexachlorophene | 0.1 |
| Anhydrous ethanol | 24.7 |
| Propellant (Freon 12/114 60/40 mixture) | 50.0 |

These were stable and had not gelled after 8 weeks' storage at 37°C. and at room temperature. The spray rate remained constant.

EXAMPLE 8

A 30% solution of a 0.729 basic aluminum chlorhydroxide solution in anhydrous ethanol SDA 40 $[Al_{16}(OH)_{35}Cl_{13}]_n$ was prepared as follows:

54 g. aluminum chloride anhydrous powder containing 10 ppm. of iron was dissolved in 579 g. anhydrous ethanol in a 2 liter reactor. 367 g. of a 5/6 basic aluminum chlorhydroxide:propylene glycol 1.0:0.5 mole ratio powder prepared as described in Example 6 was slowly added over a 2 hour period to the alcoholic aluminum chloride solution at 75°–80°C. After solution was complete, agitation and heating were continued for an additional hour. The resulting 1,000 g. solution was partially cooled and filtered to remove trace insolubles. The clear slightly viscous solution contained 16.5% aluminum as $Al_2O_3$, 9.3% chlorides, 5.3% propylene glycol, 3.9% water by the Karl Fischer method, and pH (1 + 5 parts $H_2O$) of 3.9.

Several aerosol antiperspirants were prepared in clear plastic coated glass bottles with valves using plastic coated stainless steel springs according to the following formula:

| | |
|---|---|
| 1. 0.729 Basic aluminum chlorhydroxide 30% solution in anhydrous ethanol | 18.2% w/w |
| 2. Hexachlorophene | 0.1 |
| 3. Anhydrous ethanol | 31.7 |
| 4. Propellant (Freon 12/114 60/40 mixture) | 50.0 |

The aerosols were stored and observed at room temperature and 37°C. The aerosols remained stable with no apparent change. They did not gel or precipitate. The spray rate remained constant.

100 g. of the 30% solution of a 0.729 basic aluminum chlorhydroxide solution prepared above was added to a 250 ml. glass stopper Erlenmeyer flask. 20 g. of Linde molecular sieve Type 3A powder having a normal pore diameter of 3 angstroms and an average particle diameter of less than 10 microns was added to the alcoholic solution and agitated for several hours. The treated solution was filtered through a filter paper of high retentive properties. The filtered 0.729 basic aluminum chlorhydroxide solution was found to contain 2.1% water by the Karl Fischer method. This compares with 4.9% before treatment, a reduction of 57%.

100.0 g. of this solution was added to a tared porcelain dish, and placed in a vacuum oven at 20 – 25 inches mercury for 16 hours at 50°C. 35.4 g. were recovered and ground slightly, using a mortar and pestle. The soft, white, fragile powder dissolved readily when added to warm anhydrous ethanol with stirring. It was found to contain 46.3% aluminum as $Al_2O_3$, 26.2% chlorine, 15% propylene glycol and less than 0.2% water by the Karl Fischer method. The composition approaches:

$$Al_{2.0}(OH)_{3.93}Cl_{1.63}(\text{Propylene Glycol})_{0.44}.$$

EXAMPLE 9

A 25% solution of an 0.800 basic aluminum chlorhydroxide solution in anhydrous ethanol SDA 40[$Al_5$-$(OH)_{12}Cl_3]_n$, using butylene glycol, was prepared as follows.

A 5/6 basic aluminum chlorhydroxide powder as prepared in the manner described in Example 1. It contained 45.9% aluminum as $Al_2O_3$. 300 g. was added to a bowl of a dough mixer and 135 g. butylene glycol was added dropwise, with continued agitation over a one hour period. The resulting 435 g. of free flowing powder blend contained some granules. It was pulverized in a screen type hammer mill with a large opening screen. The powder which contained 0.5 moles of butylene glycol per mole of aluminum as $Al_2O_3$ was dissolved slowly in an alcoholic solution of anhydrous aluminum chloride prepared with 15 g. of aluminum chloride low iron powder and 550 g. anhydrous ethanol SDA 40. The temperature was 75°–80°C. After solution was complete, heat and agitation were continued for an hour. The 1,000 g. batch was partially cooled, and filtered to remove trace insolubles. The clear solution contained 14.3% aluminum as $Al_2O_3$, 6.0% chloride, 13% butylene glycol and 4.2% water by the Karl Fischer method.

EXAMPLE 10

A 25.0% solution of a 1/3 (0.33) basic aluminum chlorhydroxide Al(OH)Cl$_2$ solution in anhydrous ethanol was prepared as follows.

112.5 g. of a blend of 5/6 basic aluminum chlorhydroxide powder and propylene glycol containing 39.4% $Al_2O_3$ and 14.7% propylene glycol was slowly added to an ethanol solution of anhydrous aluminum chloride prepared by adding 174 g. of the latter to 714 g. anhydrous ethanol. The temperature ranged from 75° to 80°C., and the solution was well agitated. About 40 minutes was required to dissolve all the powdered blend after which it was stirred and heated for an additional 30 minutes, after which it was cooled and filtered to remove trace insolubles. 951 g. of solution was recovered. It was found to contain 11.1% aluminum as $Al_2O_3$, 15.2% chlorine, 1.6% propylene glycol, 1.5% water by the Karl Fischer method, and a pH value of 3.8.

Several aerosols were prepared from the 0.333 basic aluminum chlorhydroxide alcoholic solution using plastic coated glass bottles and valves with plastic coated stainless steel springs. The following amounts were used for each aerosol:

| Composition | Weight |
|---|---|
| Aluminum chlorhydroxide (0.33 basic-25% solution) | 27.0 g. |
| Hexachlorophene USP | 0.1 g. |
| Anhydrous ethanol | 22.9 g. |
| Propellant (Freon 12/114 60/40 mixture) | 50.0 g. |

The bottles were stored at room temperature and 37°C. for 4 weeks. At the end of this time, the solutions had not gelled, nor had a precipitate formed. The spray rate remained constant, and the application of the composition to the axillae by two people showed that it was an effective antiperspirant.

EXAMPLE 11

A 30% by weight solution of a 0.80 basic aluminum chlorhydroxide in anhydrous ethanol, corresponding to the formula $Al_5(OH)_{12}Cl_3$, was prepared as follows.

A 5/6 basic aluminum chlorhydroxide powder 100 mesh was prepared in a manner similar to that described in Example 1. It contained 45.8% aluminum (as $Al_2O_3$), 16.0% chlorine (as $Cl^-$), and 12.5% water (by the Karl Fischer method).

214 g. of the 5/6 basic aluminum chlorhydroxide was added to the stainless steel bowl of a small dough mixer, and agitation begun. 36.5 g. of 1,2-propylene glycol was added dropwise over a 35 minute period, with constant stirring. The resulting solid, 250.5 g. of aluminum chlorhydroxide-propylene glycol complex, was pulverized to about 100 mesh, using a laboratory hammer mill.

19.6 g. of aluminum chloride hexahydrate were dissolved in 298 g. of anhydrous ethanol in a two-liter flask equipped with a glass stirrer, heating mantle, and reflux condenser. The temperature was raised to 75° to 80°C., and 250.5 g. of the 5/6 basic aluminum chlorhydroxide-propylene glycol powder was slowly added over a 2 hour period, with continued stirring. After an additional hour of stirring, the solution was filtered through an asbestos-cellulose filter pad of medium porosity.

An aerosol antiperspirant composition containing dispersed aluminum chlorhydroxide was prepared from the 30% alcohol solution of the 0.800 basic aluminum chlorhydroxide solution, to the following formulation:

| Composition | Weight |
|---|---|
| $Al_5(OH)_{12}Cl_3$ (30% solution in ethanol) | 15% |
| $Al_2(OH)_5Cl$ (alcohol-insoluble) powder | 2% |
| Fumed silica (Aerosil 200) | 2% |
| Anhydrous ethanol | 31% |
| Propellant (60/40 mixture of Freon 12/Freon 114) | 50% |

This aerosol formulation was packed in clear plastic-coated glass aerosol bottles and stored at room temperature and at 37°C. At the end of two weeks, the solution had not gelled. Application of the composition to the skin showed that it was an effective antiperspirant.

Having regard to the foregoing disclosure, the following is claimed as the inventive and patentable embodiments thereof:

1. A process for preparing alcohol-soluble aluminum chlorhydroxide-polyol compositions effective as antiperspirants and having a high content of alumina, which comprises mixing a solution of aluminum chloride in a lower aliphatic alcohol selected from the group consisting of methanol, ethanol, isopropanol, n-propanol and butanol, with an aluminum chlorhydroxide-polyol composition, the aluminum chlorhydroxide having the formula:

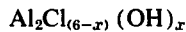

where $x$ is a number from two to five, and the polyol being selected from the group consisting of ethylene glycol; propylene glycol; 1,3-butanediol; 1,4-butanediol; diethylene glycol; dipropylene glycol; triethylene glycol; tetraethylene glycol; glycerol; diglycerol; 1,2,6-hexanetriol; 1,2,4-butanetriol; 2-methyl-2-ethyl-1,3-propanediol; 2-methyl-2,4-pentanediol; 1,1,1-trimethylolpropane; 2,2-dimethyl-1,3-dihydroxy pentane; polyethylene glycol; p-xylene α,α-diol; polyepichlorohydrin; butyne-1,4-diol; 2-ethyl-1,3-hexane-diol; and polypropylene glycol having an average molecular weight of 400 the aluminum chlorhydroxide and the polyol being taken in proportions to give an aluminum chlorhydroxide-polyol composition having an alumina:polyol ratio within the range from about 2.04:1 to about 10:1, an $Al_2O_3$:Cl ratio within the range from about 1:5 to about 1:1.05, and an $Al_2O_3$:OH ratio within the range from about 1:1 to about 1:4.95; and reacting the mixture at a temperature at which reaction proceeds to form a stable, homogeneous solution in the alcohol of an aluminum chlorhydroxide-polyol composition having an alumina:polyol ratio within the range from about 2.04:1 to about 10:1 that is lower than the alumina : polyol ratio of the aluminum chlorhydroxide-polyol composition reactant.

2. A process according to claim 1, which comprises heating the reaction mixture at a temperature within the range from about 40°C. to about 80°C., or up to the boiling point of the alcohol, at atmospheric pressure for from ½ to 6 hours.

3. A process according to claim 1, which comprises concentrating the reaction mixture so as to reduce the water content to less than 5%.

4. A process according to claim 1 wherein the polyol is 1,2-propylene glycol.

5. A process according to claim 1 wherein the polyol is trimethylolpropane.

6. A process according to claim 1 which comprises reacting from 1 to 8 moles of aluminum chloride and from 60 to 1 moles of aluminum chlorhydroxide, to produce an aluminum chlorhydroxide having an $Al_2O_3$:Cl ratio within the range from about 1:5 to about 1:1.05 and an $Al_2O_3$:OH ratio within the range from about 1:1 to about 1:4.95.

7. A process according to claim 1 in which the aluminum chlorhydroxide product has a basicity within the range from about 0.166 to about 0.825.

8. An aluminum chlorhydroxide-polyol composition having effective antiperspirant properties and prepared according to the process of claim 1, in the form of a solution in from 10 to 60% of the lower aliphatic alcohol by weight of the composition and containing less than 5.0% water by weight of the composition.

9. An aluminum chlorohydroxide-polyol composition according to claim 8 in the form of a solution of the aluminum chlorhydroxide-polyol product in a mixture of a polyol and ethanol containing less than 0.5% water by weight.

10. An aluminum chlorohydroxide-polyol composition according to claim 8 in the form of a solution of the aluminum chlorhydroxide-polyol product in ethanol.

11. An effective antiperspirant composition according to claim 8 in which the aluminum chlorhydroxide-polyol product has a basicity within the range from about 0.7 to about 0.825.

12. An aluminum chlorhydroxide-polyol composition according to claim 8 comprising from about 25 to 75% of a propellant having a vapor pressure at room temperature within the range from about 25 to about 60 psi., selected from the group consisting of dichlorotetrafluoroethane, dichlorotrifluoromethane, octafluorocyclobutane, trichloromonofluoromethane, and mixtures of dichlorodifluoromethane and trichloromonofluoromethane, the composition being stable and non-gelling.

13. An aluminum chlorhydroxide-polyol composition according to claim 12 having dispersed therein from 0.5 to 5% of an alcohol-insoluble aluminum chlorhydroxide in finely-divided form.

* * * * *

UNITED STATES PATENT OFFICE
CERTIFICATE OF CORRECTION

Patent No. 3,876,758            Dated April 8, 1975

Inventor(s) Stewart M. Beekman

It is certified that error appears in the above-identified patent and that said Letters Patent are hereby corrected as shown below:

Column 1, line 28 : "is" should be --it--

Column 3, line 20 :

$$xAlCl_3 + yAl_2(OH)_n Cl_{6-n} \rightarrow x+y(Al_n (OH)_n Cl_{3n-m})$$

should be $$xAlCl_3 + yAl_2(OH)_{n_1} Cl_{6-n_1} \rightarrow x+ y\left(Al_{n_2}(OH)_m Cl_{3n_2-m}\right)$$

Column 8, lines 16-17 :

$(OH)_5Cl,$        $Al_2$- should be $Al_2(OH)_5Cl,$

Column 13, line 39 : "29,2% w/w" should be --29.2% w/w--

Column 13, line 64 : "ethanol" should be --solution--

Column 14, lines 29-30 :

SDA 40[Al$_6$(OH)$_{35}$Cl$_{13}$]$_n$ should be

SDA 40[Al$_{16}$(OH)$_{35}$Cl$_{13}$]$_n$

UNITED STATES PATENT OFFICE
CERTIFICATE OF CORRECTION

Patent No. 3,876,758      Dated April 8, 1975

Inventor(s) Stewart M. Beekman

It is certified that error appears in the above-identified patent and that said Letters Patent are hereby corrected as shown below:

Column 15, lines 19-20 :    SDA 4O[Al$_5$(OH)$_{12}$Cl$_3$]$_n$, should be

SDA 40[Al$_5$(OH)$_{12}$Cl$_3$]$_n$ ,

Signed and Sealed this sixth Day of April 1976

[SEAL]

Attest:

RUTH C. MASON
*Attesting Officer*

C. MARSHALL DANN
*Commissioner of Patents and Trademarks*